US012650092B2

(12) United States Patent
Lutjen et al.

(10) Patent No.: US 12,650,092 B2
(45) Date of Patent: Jun. 9, 2026

(54) ACCESSIBLE DEBRIS SEPARATOR FOR HIGH PRESSURE TURBINE OUTSIDE DIAMETER FED STATIC COMPONENTS

(71) Applicant: RTX Corporation, Farmington, CT (US)

(72) Inventors: Paul M Lutjen, Kennebunkport, ME (US); Jose R Paulino, Jupiter, FL (US); Tracy A Propheter-Hinckley, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/018,995

(22) Filed: Jan. 13, 2025

(65) Prior Publication Data

US 2025/0146438 A1      May 8, 2025

Related U.S. Application Data

(62) Division of application No. 18/458,495, filed on Aug. 30, 2023, now Pat. No. 12,241,411.

(51) Int. Cl.
*F02C 7/05*        (2006.01)
*F01D 11/10*       (2006.01)

(52) U.S. Cl.
CPC ................ *F02C 7/05* (2013.01); *F01D 11/10* (2013.01); *F05D 2220/323* (2013.01); *F05D 2240/55* (2013.01); *F05D 2260/607* (2013.01)

(58) Field of Classification Search
CPC .. F02C 7/05; F02C 7/052; F01D 11/10; F05D 2220/323; F05D 2240/55; F05D 2260/607
See application file for complete search history.

(56) References Cited

U.S. PATENT DOCUMENTS

| | | | |
|---|---|---|---|
| 3,673,771 | A | 7/1972 | Dickey |
| 3,720,045 | A | 3/1973 | Murphy |
| 8,240,121 | B2 | 8/2012 | Hazzard et al. |
| 2011/0247347 | A1 | 10/2011 | Ebert et al. |

(Continued)

FOREIGN PATENT DOCUMENTS

| | | |
|---|---|---|
| CA | 2909457 | 4/2016 |
| CA | 3048147 | 7/2018 |
| EP | 0357173 | 8/1992 |

(Continued)

OTHER PUBLICATIONS

European Patent Office, European Search Report dated Jan. 28, 2025 in Application No. 24192464.6.

(Continued)

*Primary Examiner* — Steven M Sutherland
(74) *Attorney, Agent, or Firm* — SNELL & WILMER L.L.P.

(57) ABSTRACT

An accessible debris separator for a gas turbine engine is provided. The accessible debris separator including a chamber formed by a entrance wall, an exit wall, an inner wall, and an outer wall; a plurality of inlet openings in the entrance wall; a plurality of outlet openings in the exit wall; and a component within the chamber, the component forcing cooling air with debris particulates entering the chamber via an inlet opening of the plurality of inlet openings to take a circuitous path thereby separating the debris particulates from the cooling air prior to the cooling air exiting the chamber via an outlet opening of the plurality of outlet openings.

10 Claims, 17 Drawing Sheets

(56) References Cited

U.S. PATENT DOCUMENTS

| | | |
|---|---|---|
| 2018/0209284 A1 | 7/2018 | Day et al. |
| 2019/0264616 A1 | 8/2019 | Lovett |

FOREIGN PATENT DOCUMENTS

| | | |
|---|---|---|
| EP | 0690202 | 8/2001 |
| EP | 2042223 | 9/2011 |
| EP | 3751017 | 12/2022 |
| EP | 4212706 | 7/2023 |

OTHER PUBLICATIONS

USPTO; Notice of Allowance dated Dec. 4, 2024 in U.S. Appl. No. 18/458,495.

USPTO; Non-Final Office Action dated Aug. 15, 2024 in U.S. Appl. No. 18/458,495.

USPTO; Requirement for Restriction/Election dated Jul. 18, 2024 in U.S. Appl. No. 18/458,495.

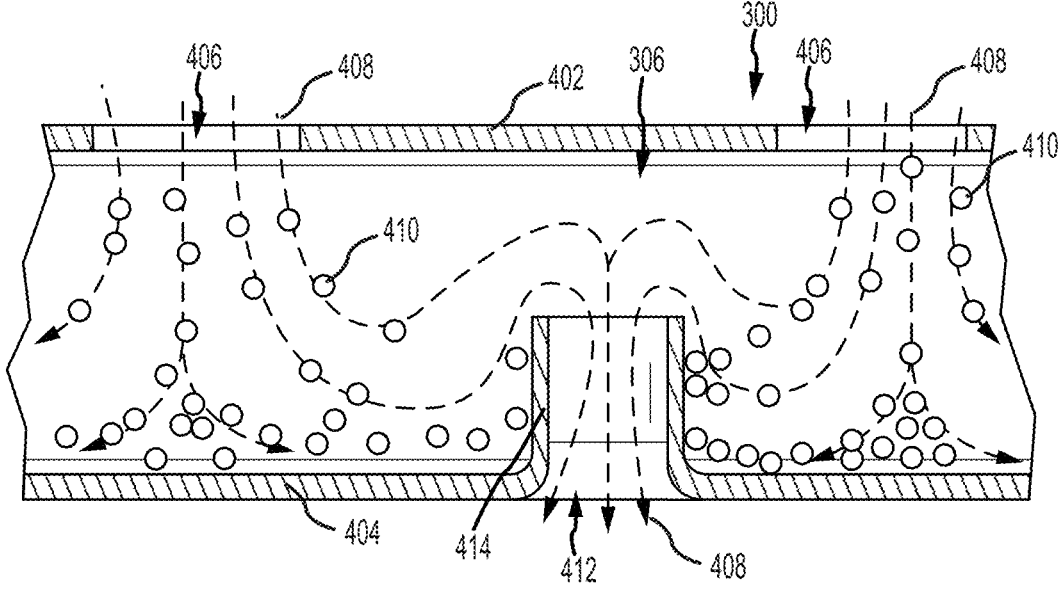
FIG.4B
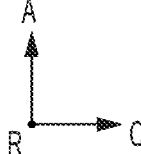

ACCESSIBLE DEBRIS SEPARATOR FOR HIGH PRESSURE TURBINE OUTSIDE DIAMETER FED STATIC COMPONENTS

CROSS-REFERENCE TO RELATED APPLICATIONS

This application is a divisional of, claims priority to and the benefit, U.S. patent application Ser. No. 18/458,495, filed Aug. 30, 2023, entitled "ACCESSIBLE DEBRIS SEPARATOR FOR HIGH PRESSURE TURBINE OUT-SIDE DIAMETER FED STATIC COMPONENTS," which is incorporated by reference herein in its entirety for all purposes.

FIELD

The present disclosure relates to components in turbine engines, and more particularly, an accessible debris separa-tor for high pressure turbine outside diameter fed static components.

BACKGROUND

Gas turbine engines, such as those that power modern commercial and military aircraft and those that are used for land-based power generation, include a compressor section to pressurize a supply of air, a combustor section to burn a fuel in the presence of the pressurized air, and a turbine section to extract energy from the resultant combustion gases to generate thrust or electrical power.

Air exiting a high-pressure combustor of a gas turbine engine may carry debris, which often enters a blade outer air seal (BOAS) cooling passages. The presence of such debris may decrease cooling air provided to the BOAS, thereby reducing a cooling effectiveness (leading to increased metal temperatures) and increasing a pressure ratio. A reduced cooling effectiveness and an increased pressure ratio may lead to premature oxidation, thermo-mechanical fatigue (TMF) failure, and creep.

SUMMARY

An accessible debris separator for a gas turbine engine is disclosed herein. The accessible debris separator including a chamber formed by an entrance wall, an exit wall, an inner wall, and an outer wall; a plurality of inlet openings in the entrance wall; a plurality of outlet openings in the exit wall; and a component within the chamber. The component forc-ing cooling air with debris particulates entering the chamber via an inlet opening of the plurality of inlet openings to take a circuitous path thereby separating the debris particulates from the cooling air prior to the cooling air exiting the chamber via an outlet opening of the plurality of outlet openings.

In various embodiments, the plurality of inlet openings in the entrance wall are offset in a circumferential direction with the plurality of outlet openings in the exit wall. In various embodiments, the component within the chamber is a protrusion, the protrusion protruding opposite the entrance wall into the chamber from an outlet opening of the plurality of outlet openings in the exit wall. In various embodiments, the component within the chamber is a diverter, the diverter coupled to at least one adjoining wall and extending radially outward into the chamber past the plurality of inlet openings. In various embodiments, the component within the chamber is a set of components, where the diverter is a first component of the set of components and where a second compo-nent of the set of components is a protrusion, the protrusion protruding opposite the entrance wall into the chamber from an outlet opening of the plurality of outlet openings in the exit wall.

In various embodiments, the component within the cham-ber is a set of components, wherein first component of the set of components is a first diverter, the first diverter coupled to at least one of the inner wall or the outer wall and extending radially outward into the chamber past the plu-rality of inlet openings, wherein a second component of the set of components is a second diverter, the second diverter protruding axially opposite the entrance wall into the cham-ber and shrouding an outlet opening of the plurality of outlet openings in the exit wall. In various embodiments, the second diverter includes a bent portion that bends inward such that ends of the bent portion shroud the outlet opening of the plurality of outlet openings in the exit wall. In various embodiments, the second diverter includes a set of shaped portions coupled together at a radially upstream flow point and opening downstream such that ends of the shaped portions shroud the outlet opening of the plurality of outlet openings in the exit wall.

In various embodiments, the component within the cham-ber is a set of components, where a first component of the set of components is a first diverter, the first diverter positioned within the chamber at a distance from an inlet opening of the plurality of inlet openings, coupled to at least one of the inner wall, the outer wall, or the entrance wall, and extending circumferentially from the entrance wall into the chamber at a first angle, and where a second component of the set of components is a second diverter, the second diverter positioned within the chamber at a distance from of an outlet opening of the plurality of outlet openings, coupled to at least one of the inner wall, the outer wall, or the exit wall, and extending circumferentially from the exit wall into the chamber at a second angle.

In various embodiments, the component within the cham-ber is a set of components, where first component of the set of components is a diverter, the diverter positioned within the chamber at a distance from an inlet opening of the plurality of inlet openings, coupled to at least one of the inner wall or the outer wall, and extending circumferentially from the entrance wall into the chamber and to the exit wall at an angle, and where a second component of the set of components is a protrusion, the protrusion protruding oppo-site the entrance wall into the chamber from an outlet opening of the plurality of outlet openings in the exit wall.

In various embodiments, the component within the cham-ber is a set of components, where a first component of the set of components is a diverter, the diverter positioned within the chamber at a distance from an inlet opening of the plurality of inlet openings, coupled to at least one of the inner wall, the outer wall, or the entrance wall, and extend-ing circumferentially from the entrance wall into the cham-ber at an angle, and where a second component of the set of components is a circumferentially-directed outlet opening such that a portion of the exit wall is positioned opposite the entrance wall into the chamber forming the circumferen-tially-directed outlet opening.

In various embodiments, the component within the cham-ber is a set of components, where a first component of the set of components is an inlet device, where the inlet device is coupled to an inlet opening of the plurality of inlet openings and extends into the chamber, where the inlet device is at least one of a tube or closed channel, where the inlet device redirects the cooling air with the debris particulates in a first circumferential direction, where second component of the set of components is an outlet device, where the outlet device is coupled to an outlet opening of the plurality of outlet openings and extends into the chamber, where the outlet device is at least one of a tube or closed channel, where the outlet device redirects the cooling air without the debris particulates in a second circumferential direction opposite the first circumferential direction.

In various embodiments, the accessible debris separator further includes a port aligned with a radially outward portion of the accessible debris separator, where the port provides for removal of accumulated the debris particulates separated from the cooling air. In various embodiments, the port further aligns with a case boss or a borescope port of the gas turbine engine. In various embodiments, the accessible debris separator is separated into a plurality of sub-chambers. In various embodiments, each sub-chamber comprises an associated port that provides for removal of accumulated the debris particulates separated from the cooling air in a respective chamber.

In various embodiments, the accessible debris separator is positioned within at least one of a diffuser or turbine case. In various embodiments, the accessible debris separator is positioned forward a blade outer air seal (BOAS). In various embodiments, the accessible debris separator is one of a plurality of accessible debris separators and wherein each accessible debris separator of the plurality of accessible debris separators is positioned forward a blade outer air seal (BOAS).

Also disclosed herein is a gas turbine engine. The gas turbine engine includes a blade outer air seal (BOAS) and an accessible debris separator positioned forward the BOAS. The accessible debris separator includes a chamber formed by an entrance wall, an exit wall, an inner wall, and an outer wall; a plurality of inlet openings in the entrance wall; a plurality of outlet openings in the exit wall; and a component within the chamber, the component forcing cooling air with debris particulates entering the chamber via an inlet opening of the plurality of inlet openings to take a circuitous path thereby separating the debris particulates from the cooling air prior to the cooling air exiting the chamber via an outlet opening of the plurality of outlet openings.

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 4A and 4B illustrate, an isometric view and a top cross-sectional view along line B-B, respectively, of a portion of an accessible debris separator for use in a gas turbine engine, in accordance with various embodiments.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As stated previously, air exiting a high-pressure combustor of a gas turbine engine may carry debris, which often enters a blade outer air seal (BOAS) cooling passages. The presence of such debris may decrease cooling air provided to the BOAS thereby reducing a cooling effectiveness (increased metal temperatures) and increasing a pressure ratio.

A reduced cooling effectiveness and an increased pressure ratio may lead to premature oxidation, thermo-mechanical fatigue (TMF) failure, and creep.

Disclosed herein is an accessible debris separator that may be positioned within a diffuser and/or turbine case that allows cooling air to pass through while separating debris particulates from the cooling air. In various embodiments, the accessible debris separator includes one or more features that cause the cooling air to make sharp turns which causes the debris particulates to be separated from the cooling air. In various embodiments, by separating the debris particulates from the cooling air, the accessible debris separator significantly improves the cleanliness of the cooling air that is passed to turbine gas path components. In various embodiments, the separated particulates accumulate within chambers of the accessible debris separator. In various embodiments, the chambers of the accessible debris separator are aligned with case bosses or borescope ports, among others, and provides for access to the chambers for removal of the accumulated debris particulates.

Figure 1:
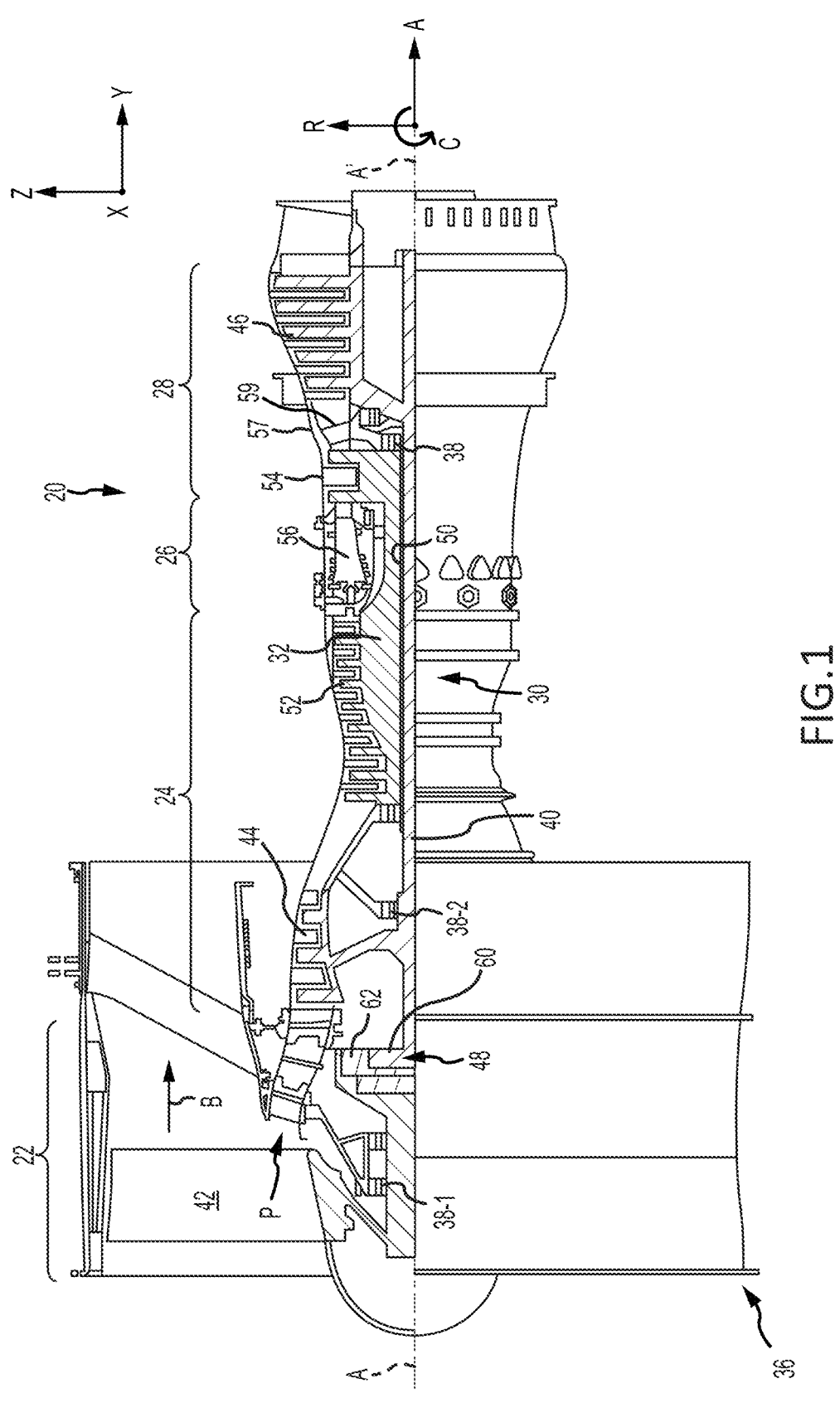
FIG. 1 illustrates a cross-sectional view of a gas-turbine engine, in accordance with various embodiments.

With reference to FIG. 1, a cross sectional view, in an axial direction, a gas turbine engine 20 is illustrated shown according to various embodiments. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion, or to the direction associated with the inlet of the gas turbine engine. As utilized herein, radially inward refers to the negative R direction (towards axis A-A') and radially outward refers to the R direction (away from the A-A' axis). An A-R-C axis is shown in various drawings to illustrate the relative position of various components.

Gas turbine engine 20 may be a two-spool turbofan that generally incorporates a fan section 22, a compressor section 24, a combustor section 26, and a turbine section 28. In operation, fan section 22 may drive fluid, i.e. air, along a path of bypass airflow B while compressor section 24 may drive the fluid along a core flow path P for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines.

Gas turbine engine 20 may generally include a low-speed spool 40 and a high-speed spool 32 mounted for rotation about an engine central longitudinal axis A-A' relative to an engine static structure 36 or engine case via several bearing systems 38, 38-1, 38-2, etc. Engine central longitudinal axis A-A' is oriented in the y-direction on the provided X-Y-Z axes. It should be understood that various bearing systems 38 at various locations may alternatively or additionally be provided, including for example, bearing system 38, bearing system 38-1, bearing system 38-2, etc.

Low-speed spool 40 may generally include an inner shaft 40 that interconnects a fan 42, a low-pressure compressor 44, and a low-pressure turbine 46. Inner shaft 40 may be connected to fan 42 through a geared system 48 that may drive the fan 42 at a lower speed than low-speed spool 40. Geared system 48 may include a gear assembly enclosed within a gear housing. Geared system 48 couples the inner shaft 40 to a rotating fan structure. The geared architecture 48 includes a gear assembly 60 enclosed within a gear housing 62. The gear assembly 60 couples the inner shaft 40 to a rotating fan structure.

High-speed spool 32 may include an outer shaft 50 that interconnects a high-pressure compressor 52 and high-pressure turbine 54. A combustor section 56 may be located between high-pressure compressor 52 and high-pressure turbine 54. A mid-turbine frame 57 of engine static structure 30 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low-pressure compressor 44 then high-pressure compressor 52, mixed and burned with fuel in the combustor section 56, then expanded over high-pressure turbine 54 and low-pressure turbine 46. The mid-turbine frame 57 includes airfoils 59 which are in the core airflow path C. Turbines 46, 54 rotationally drive the respective low-speed spool 40 and high-speed spool 32 in response to the expansion. It will be appreciated that each of the positions of the fan section 22, compressor section 24, combustor section 26, turbine section 28, and geared system 48 may be varied. In various embodiments, geared system 48 may be located aft of combustor section 26 or even aft of turbine section 28, and fan section 22 may be positioned forward or aft of the location of geared system 48.

The gas turbine engine 20, in various embodiments, is a high-bypass geared aircraft engine. In various embodiments, the gas turbine engine 20 bypass ratio is greater than about six (6), with an example embodiment being greater than about ten (10), the geared system 48 is an epicyclic gear train, such as a planetary gear system or other gear system, with a gear reduction ratio of greater than about 2.3 and the low-pressure turbine 46 has a pressure ratio that is greater than about five. In various embodiments, the gas turbine engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
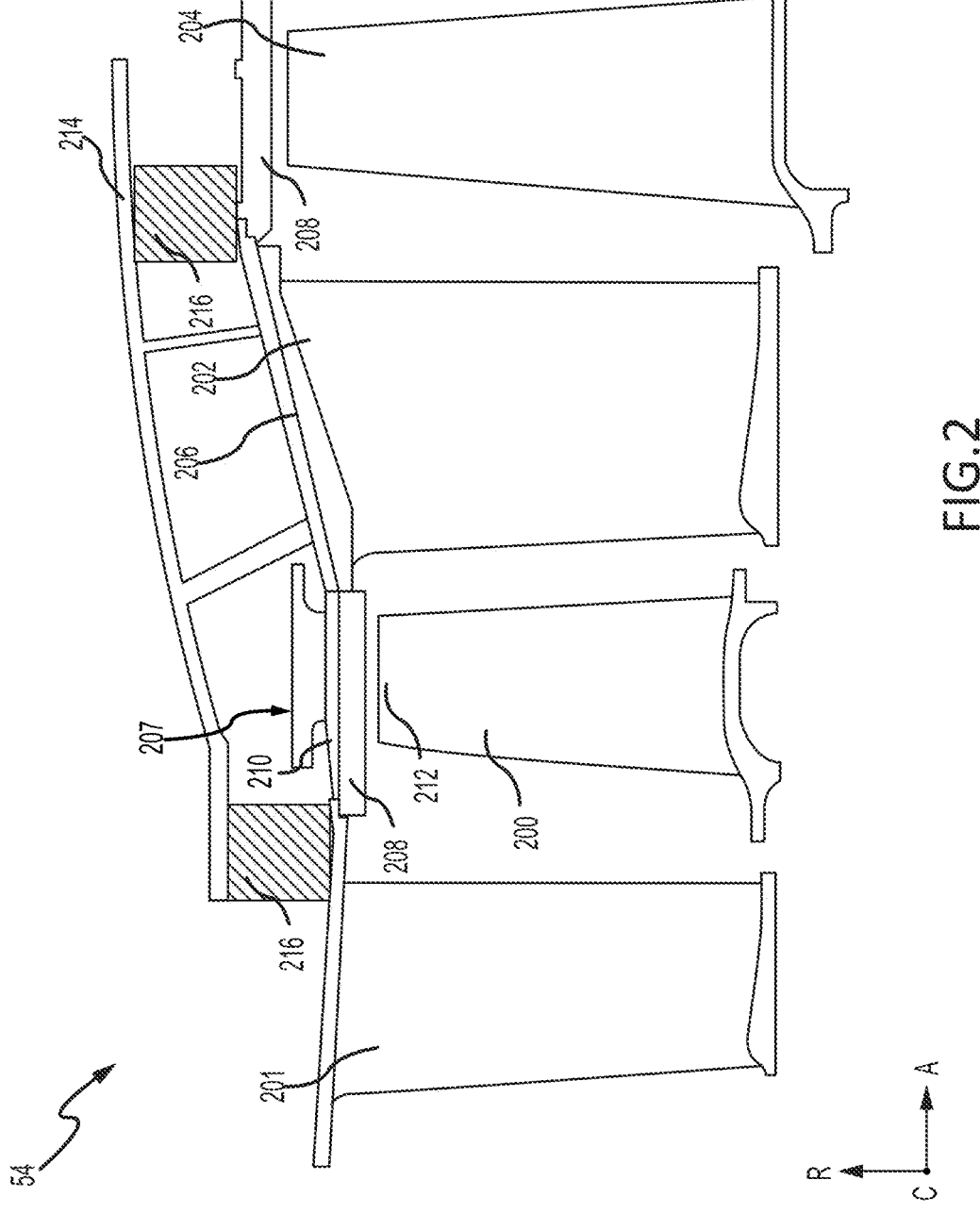
FIG. 2 is an enlarged schematic cross-section of a portion of a high-pressure turbine section of the gas turbine engine of FIG. 1, in accordance with various embodiments.

With reference now to FIGS. 1 and 2, a portion of the high-pressure turbine 54 includes a first vane 201, a first rotor blade 200, a second vane 202, and a second rotor blade 204. The first rotor blade 200 and the second rotor blade 204 are each configured to rotate about the axis A-A' relative to first vane 201 and second vane 202 in response to receiving a flow of fluid from the combustor section 26. Thus, kinetic energy from the flow is converted to mechanical energy, or torque, by the first rotor blade 200 and the second rotor blade 204. The second vane 202 is coupled to a frame 214 of the high-pressure turbine 54 and conditions the flow of air between the first rotor blade 200 and the second rotor blade 204. The second vane 202 thus acts as a stator and does not rotate relative to the axis A-A'.

A blade outer air seal (BOAS) 208 is located radially outward from the first rotor blade 200. The high-pressure turbine 54 may include multiple BOASs 208 positioned adjacent each other circumferentially and surrounding the longitudinal axis A-A' of FIG. 1. The BOAS 208 is designed to function as a seal to reduce axial air leakage between a tip 212 of the first rotor blade 200 and the frame 214. In particular, the BOAS 208 has an inner surface that forms a seal along with the tip 212 of the first rotor blade 200. In that regard, the core airflow C of FIG. 1 may contact the inner surface of the BOAS 208.

A shroud block 210 (which may also be referred to as a support 210) may be positioned radially outward from the BOAS 208 and may couple the BOAS 208 to the frame 214. The shroud block 210 may resist movement of the BOAS 208 relative to the frame 214. Stated differently, the shroud block 210 may retain the BOAS 208 in place relative to the frame 214.

As mentioned above, the rotor blades 200, 204, the first vane 201, the second vane 202, and the BOAS 208 may be exposed to the core airflow C of FIG. 1. The core airflow may be relatively hot, and thus it may be desirable for the rotor blades 200, 204, the first vane 201, the second vane 202, and the BOAS 208 to be relatively heat resistant. In that regard, each of these components may be coated with a ceramic material to increase their respective heat resistance. In that regard, the ceramic coating insulates the component part from abrupt changes in temperature. In various embodiments, if the component has a thick portion of metal adjacent to a thin portion of metal and the back side of the component is cooled using cooling fluid, then the thicker portion of the component may retain heat longer than the thinner portion, which may create a thermal stress between the tick and the thin. Accordingly, in various embodiments, the ceramic coating may smooth the thermal transition between the two sections reducing stress and dilutes and evens out the temperature of the metallic part. In various embodiments, oxidization may be prevented by the metallic coatings of aluminum or cobalt oxides, which may prevent the infiltration of oxygen into the metallic substrate. Although the present disclosure discusses ceramic coated parts of the high-pressure turbine 54, one skilled in the art will realize that any ceramic coated part of the gas turbine engine 20 of FIG. 1 is covered within the scope of the disclosure.

In various embodiments, an accessible debris separator 216 may be positioned within a diffuser and/or turbine case that allows cooling air to pass through while separating debris particulates from the cooling air. In various embodiments, the accessible debris separator 216 may be positioned proximate the BOAS 208. In various embodiments, the accessible debris separator 216 may be positioned forward of the BOAS 208. In various embodiments, the accessible debris separator 216 may be positioned forward of the BOAS 208 in order to significantly improve the cleanliness of the cooling air that is passed to turbine gas path components such as BOAS 208 or the first vane 201.

Figure 3:
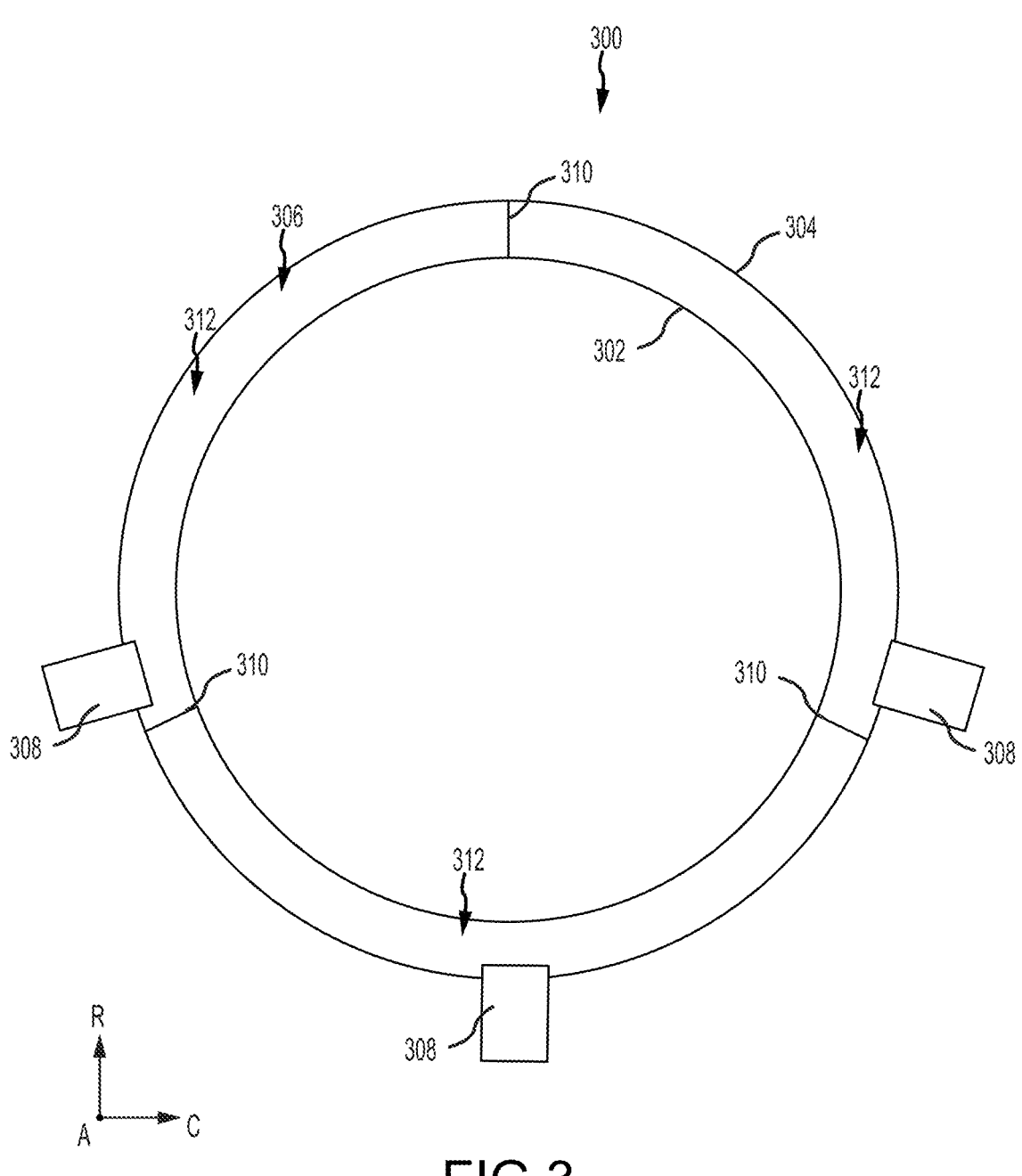
FIG. 3 illustrates a view, in an axial direction, of an accessible debris separator for use in a gas turbine engine, in accordance with various embodiments.

Referring to FIG. 3, a view, in an axial direction, of an accessible debris separator for use in a gas turbine engine is illustrated, in accordance with various embodiments. In various embodiments, the accessible debris separator 300, such as accessible debris separator 216 of FIG. 2, may be concentric within the gas turbine engine. In various embodiments, the accessible debris separator 300 includes a forward wall and an aft wall, the aft wall being aft of the forward wall. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall and the aft wall. In various embodiments, the outer wall 304 is coupled to the forward wall and the aft wall. In that regard, in various embodiments, the forward wall, the aft wall, the inner wall 302, and the outer wall 304 form a chamber 306. In various embodiments, the accessible debris separator 300 includes one or more components that cause cooling air that enters chamber 306 to make sharp turns which causes debris particulates to be separated from the cooling air and move out of the main cooling stream, i.e. the radial portion of the accessible debris separator 300. In that regard, the accessible debris separator 300 includes at least one port 308 aligned with case bosses or borescope ports, among others, for removal of the accumulated debris particulates. In various embodiments, the chamber 306 of the accessible debris separator 300 may include a plurality of chamber separators 310 that separate the chamber into a plurality of sub-chambers 312. In that regard, each of the sub-chambers 312 includes at respective port 308 aligned with case bosses or borescope ports, among others, for removal of the accumulated debris particulates.

Figure 4A:
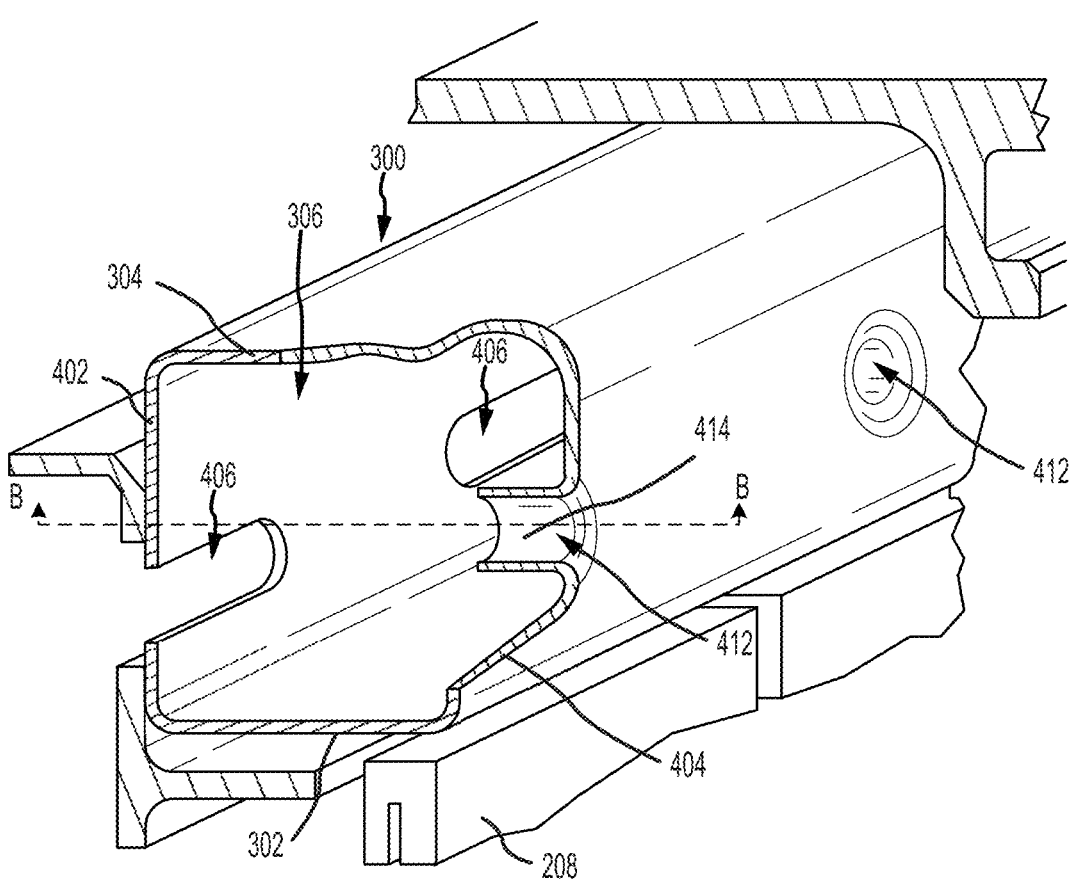
Figure 4A:
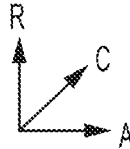

Referring to FIGS. 4A and 4B, an isometric view and a circumferentially fillet cross-sectional view along line B-B, respectively, of a portion of an accessible debris separator for use in a gas turbine engine are illustrated, in accordance with various embodiments. In various embodiments, the accessible debris separator 300 includes an entrance or forward wall 402 and an exit or aft wall 404, the aft wall 404 being aft of the forward wall 402. While in FIGS. 4A and 4B as well as all of the following figures, the entrance wall is depicted as the forward wall and the exit wall is depicted as the aft wall, in various embodiments, an entrance wall is any wall of an accessible debris separator where cooling air enters the accessible debris separator and an exit wall is any wall where cooling air exits the accessible debris separator. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

In various embodiments, the forward wall 402 of the accessible debris separator 300 may include a plurality of inlet openings 406 that allows cooling air 408 with debris particulates 410 to enter the chamber 306. In various embodiments, the aft wall 404 of the accessible debris separator 300 may include a plurality of outlet openings 412 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in an axial direction because the plurality of inlet openings 406 in the forward wall 402 do not align, i.e. are offset, with the plurality of outlet openings 412 in the aft wall 404. In that regard, the cooling air 408 is forced to make sharp turns in order to exit the chamber 306 via the plurality of outlet openings 412. In various embodiments, the plurality of outlet openings 412 may include a protrusion 414 that protrudes axially forward into the chamber 306 from each of the plurality of outlet openings 412 in the aft wall 404. In various embodiments, the protrusion 414 may have a substantially cylindrical shape or a racetrack shape, among others. In various embodiments, the protrusion 414 may extend into the chamber 306 between one-eighth to one-half of the distance between the aft wall 404 and the forward wall 402.

Accordingly, in various embodiments, the protrusion 414 is one of a set of components within the chamber 306 that forces the cooling air 408 to make sharp turns, another component being the misalignment of the plurality of inlet openings 406 in the forward wall 402 with the plurality of outlet openings 412 in the aft wall 404. In various embodiments, the sharp turns made by the cooling air 408 forces the debris particulates 410 to separate from the cooling air 408. In various embodiments, the debris particulates 410 move radially within the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Figure 5A:
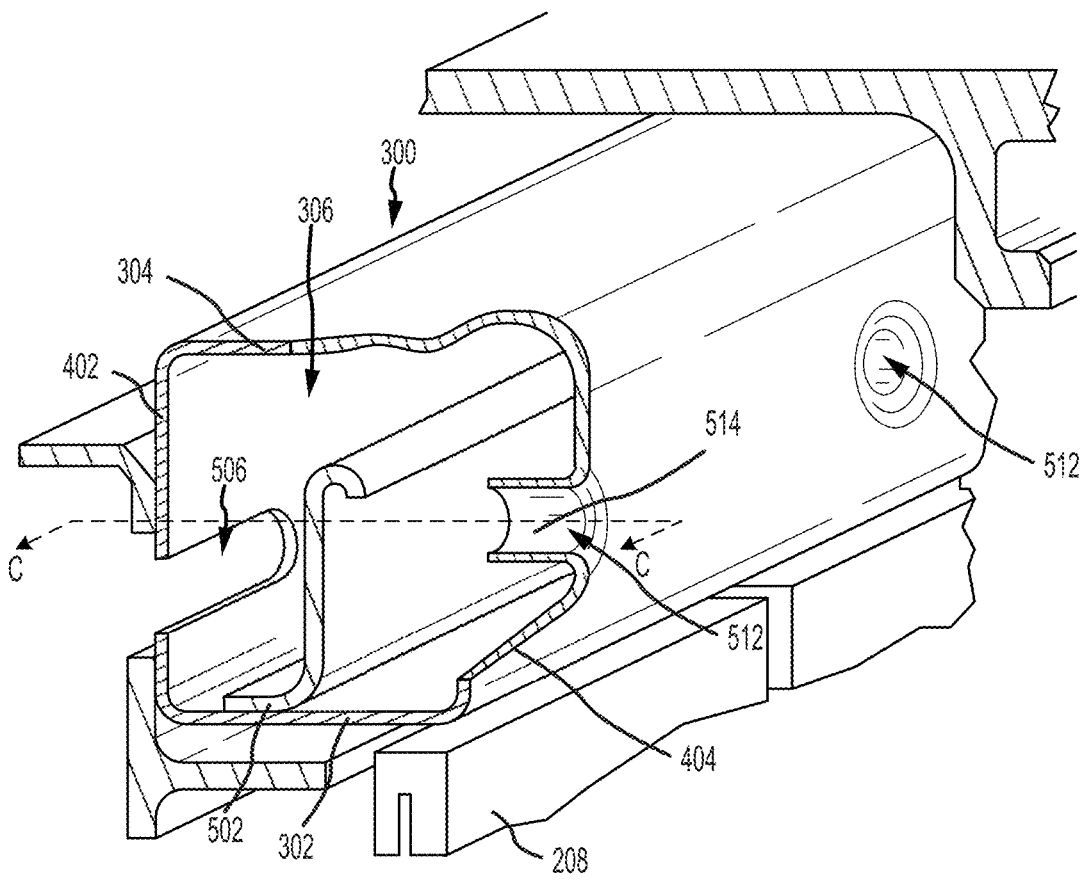
FIGS. 5A and 5B illustrate an isometric view and an engine cross-sectional view along line C-C of a portion of an accessible debris separator for use in a gas turbine engine, in accordance with various embodiments.
Figure 5B:
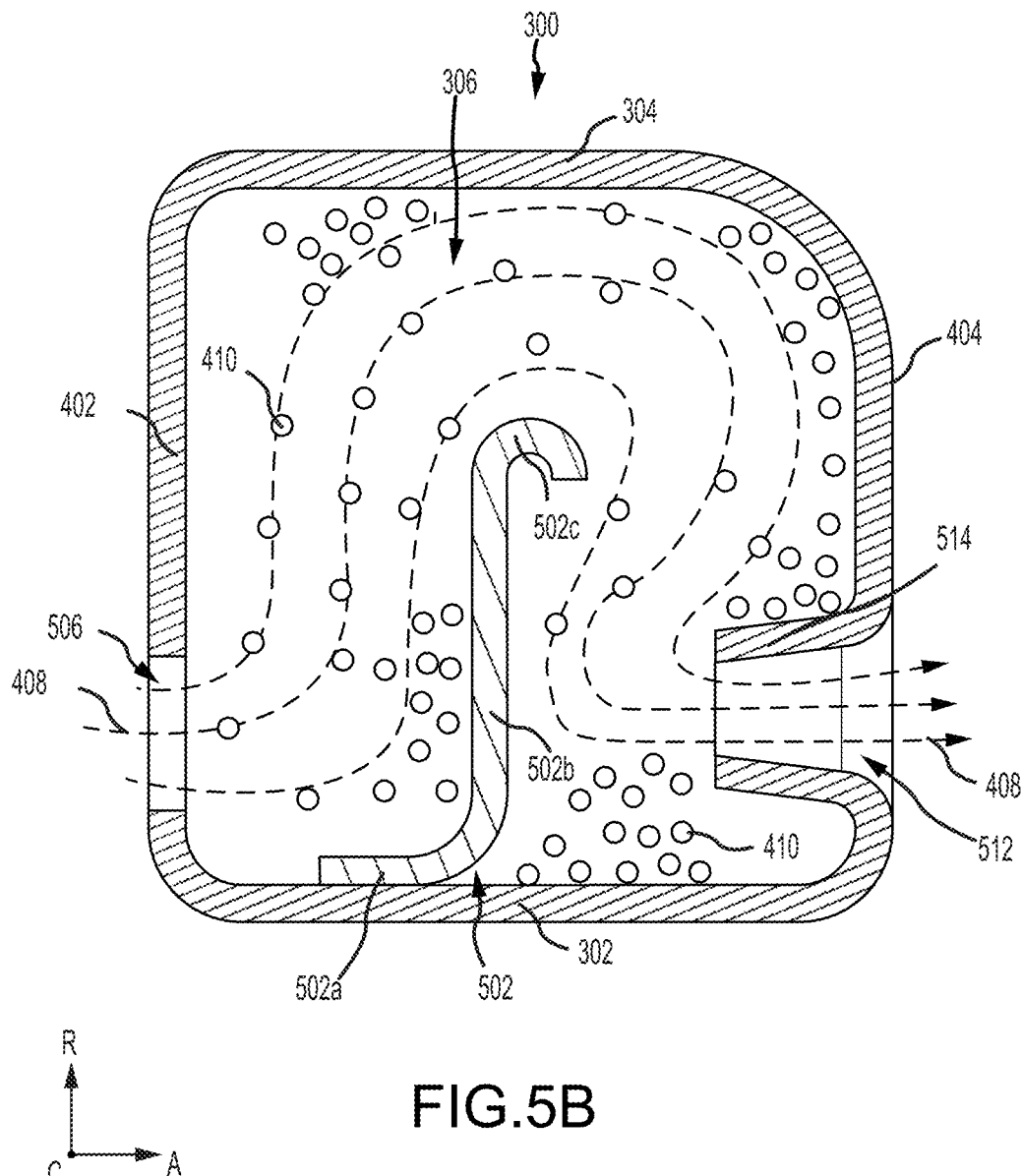

Referring to FIGS. 5A and 5B, an isometric view and an engine cross-sectional view along line C-C of a portion of an accessible debris separator for use in a gas turbine engine are illustrated, in accordance with various embodiments. In various embodiments, the accessible debris separator 300 includes an entrance or forward wall 402 and an exit or aft wall 404, the aft wall 404 being aft of the forward wall 402. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

In various embodiments, the forward wall 402 of the accessible debris separator 300 may include a plurality of inlet openings 506 that allows cooling air 408 with debris particulates 410 to enter the chamber 306. In various embodiments, the aft wall 404 of the accessible debris separator 300 may include a plurality of outlet openings 512 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in an outward radial direction and then in an inward radial direction due to a diverter 502. In various embodiments, the diverter 502 includes a base component 502a that is coupled to an adjoining wall, i.e. the inner wall 302 or the outer wall 304, an extension component 502b that is coupled to the base component 502a and extends radially outward from the inner wall 302 past the plurality of inlet openings 506, and a hook component 502c that is coupled to the extension component 502b and curves in an axially aft direction toward the aft wall 404. In various embodiments, due to the inclusion of the diverter 502, the plurality of inlet openings 506 in the forward wall 402 may or may not align, i.e. may be offset, with the plurality of outlet openings 512 in the aft wall 404. In that regard, the cooling air 408 is forced to make sharp turns in order to exit the chamber 306 via the plurality of outlet openings 512. In various embodiments, the plurality of outlet openings 512 may include a protrusion 514 that protrudes axially forward into the chamber 306 from the aft wall 404. In various embodiments, the protrusion 414 may have a substantially cylindrical shape or a racetrack shape, among others. In various embodiments, the protrusion 514 may extend into the chamber 306 between one-eighth to one-half of the distance between the aft wall 404 and the diverter 502.

Accordingly, in various embodiments, the protrusion 514 is one of a set of components within the chamber 306 that forces the cooling air 408 to make sharp turns, another component being the diverter 502, and yet another component being a misalignment, where implemented, of the plurality of inlet openings 506 in the forward wall 402 with the plurality of outlet openings 512 in the aft wall 404. In various embodiments, the sharp turns made by the cooling air 408 forces the debris particulates 410 to separate from the cooling air 408. In various embodiments, the debris particulates 410 move radially within the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Referring to FIGS. 6A, 6B, 6C, and 6D, an isometric view, an engine cross-sectional view along line C-C, and front cross-sectional views along line D-D of a portion of an accessible debris separator for use in a gas turbine engine are illustrated, in accordance with various embodiments. In various embodiments, the accessible debris separator 300 includes an entrance or forward wall 402 and an exit or aft wall 404 aft of the forward wall 402. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

Figure 6A:
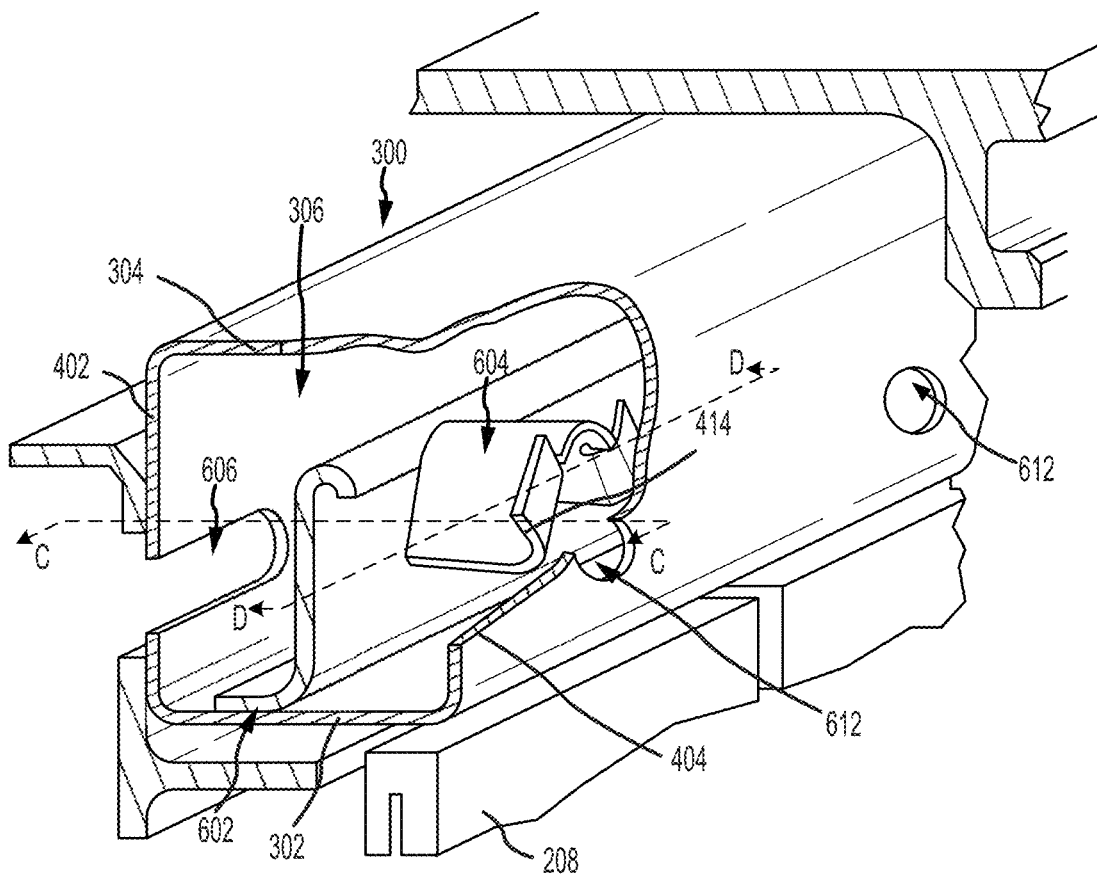
FIGS. 6A, 6B, 6C, and 6D illustrate an isometric view, an engine cross-sectional view along line C-C, and front cross-sectional views along line D-D of a portion of an accessible debris separator for use in a gas turbine engine, in accordance with various embodiments.
Figure 6A:
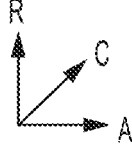
Figures 6B, 6C, 6D:
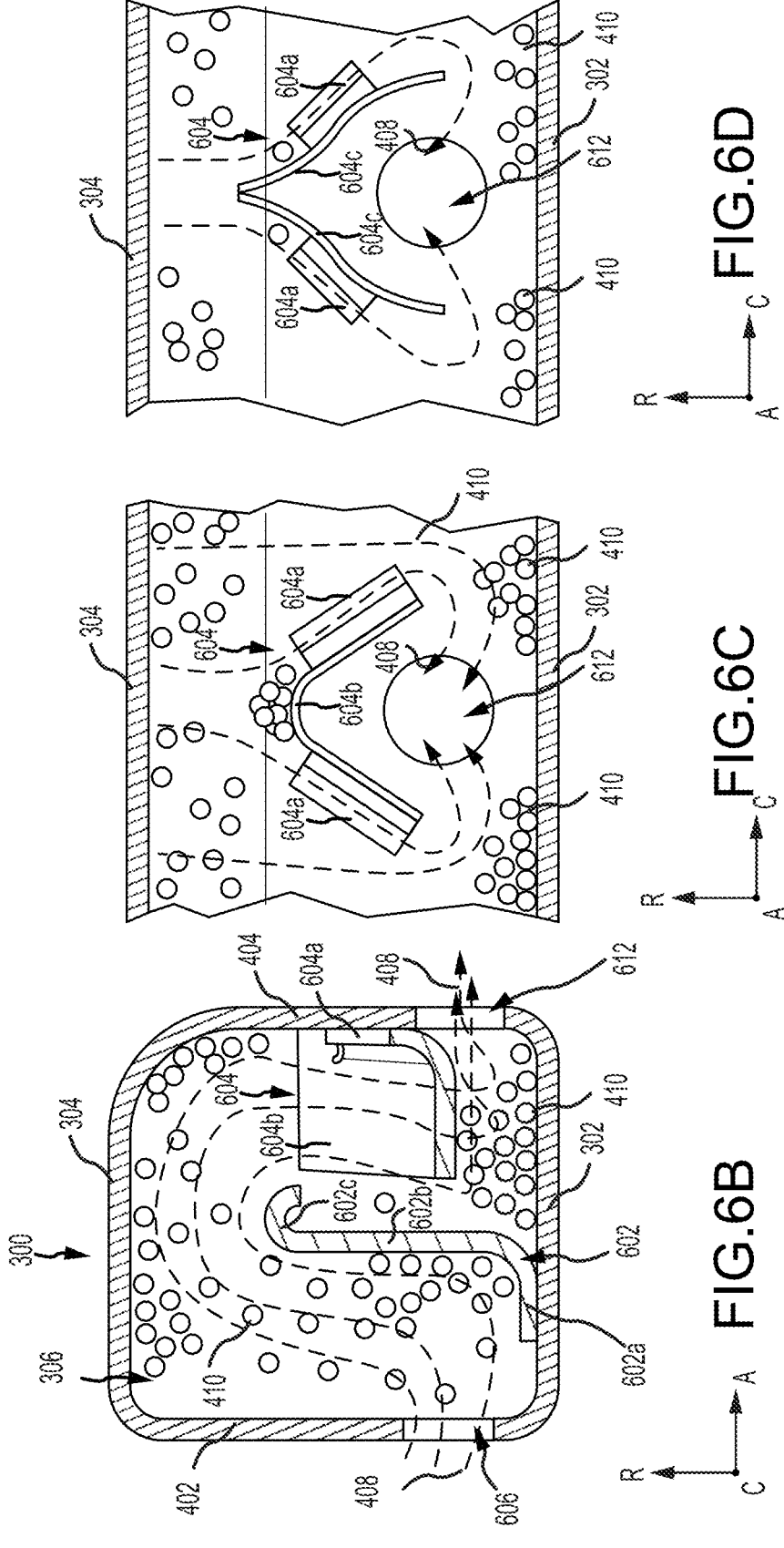

In various embodiments, the forward wall 402 of the accessible debris separator 300 may include a plurality of inlet openings 606 that allows cooling air 408 with debris particulates 410 to enter the chamber 306. In various embodiments, the aft wall 404 of the accessible debris separator 300 may include a plurality of outlet openings 612 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in an outward radial direction and then in an inward radial direction due to a first diverter 602. In various embodiments, the first diverter 602 includes a base component 602a that is coupled to the inner wall 302, an extension component 602b that is coupled to the base component 602a and extends radially outward from the inner wall 302 past the plurality of inlet openings 606, and a hook component 602c that is coupled to the extension component 602b and curves in an axially aft direction toward the aft wall 404. In various embodiments, due to the inclusion of the first diverter 602, the plurality of inlet openings 606 in the forward wall 402 may or may not align, i.e. may be offset, with the plurality of outlet openings 612 in the aft wall 404. In that regard, the cooling air 408 is forced to make sharp turns in order to exit the chamber 306 via the plurality of outlet openings 612. In various embodiments, just after the cooling air 408 is forced to take a circuitous path in the inward radial direction due to a first diverter 602, the cooling air 408 is forced to take another circuitous path in a circumferential direction due to a second diverter 604. As is illustrated in FIGS. 6A, 6B, and 6C, in various embodiments, the second diverter 604 may include a set of base portions 604a coupled to the aft wall 404 and a bent portion 604b coupled to the base portions 604a and protruding axially forward into the chamber 306 from the base portions 604a. In various embodiments, the bent portion 604b may extend into the chamber 306 between one-eighth to one-half of the distance between the aft wall 404 and the diverter 602. In various embodiments, the bent portion 604b may bend radially inward such that the ends of the bent portion 604b shroud an associated outlet opening of the plurality of outlet openings 612. That is, a second diverter 604 is associated with each outlet opening of the plurality of outlet openings 612.

In various embodiments, as is illustrated in FIG. 6D, the second diverter 604 may include a set of base portions 604a coupled to the aft wall 404 and a set of "S" shaped or inverted "S" shaped portions 604c coupled to the base portions 604a and protruding axially forward into the chamber 306 from the base portions 604a. In various embodiments, the shaped portions 604c may extend into the chamber 306 between one-eighth to one-half of the distance between the aft wall 404 and the diverter 602. In various embodiments, the shaped portions 604c may be coupled together at a radially upstream flow point and may open radially downstream such that the ends of the shaped portions 604c shroud an associated outlet opening of the plurality of outlet openings 612. That is, a second diverter 604 is associated with each outlet opening of the plurality of outlet openings 612.

Accordingly, in various embodiments, the second diverter 604 is one of a set of components within the chamber 306 that forces the cooling air 408 to make sharp turns, another component being the first diverter 602, and yet another component being a misalignment, where implemented, of the plurality of inlet openings 606 in the forward wall 402 with the plurality of outlet openings 612 in the aft wall 404. In various embodiments, the sharp turns made by the cooling air 408 forces the debris particulates 410 to separate from the cooling air 408. In various embodiments, the debris particulates 410 move radially within the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Figure 7A:
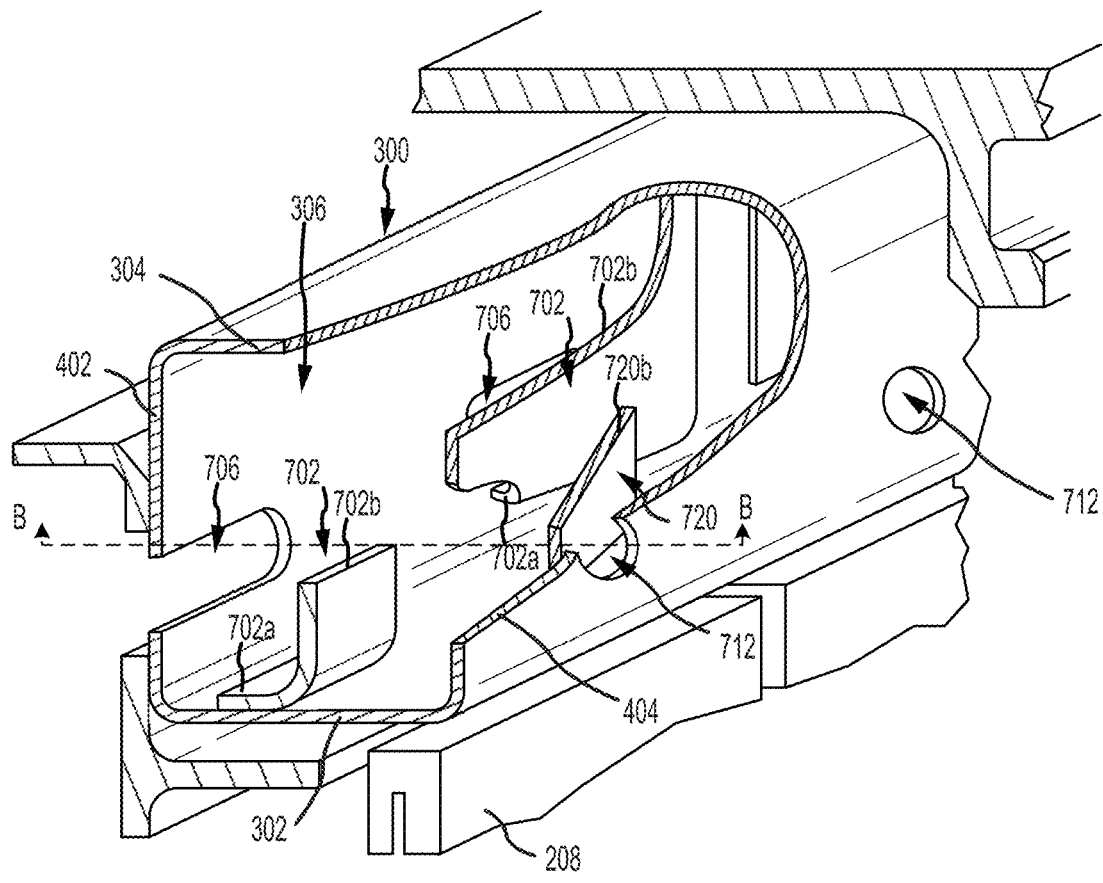
FIGS. 7A and 7B illustrate an isometric view and a top cross-sectional view along line B-B, respectively, of a portion of an accessible debris separator for use in a gas turbine engine, in accordance with various embodiments.
Figure 7A:
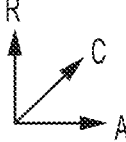
Figure 7B:
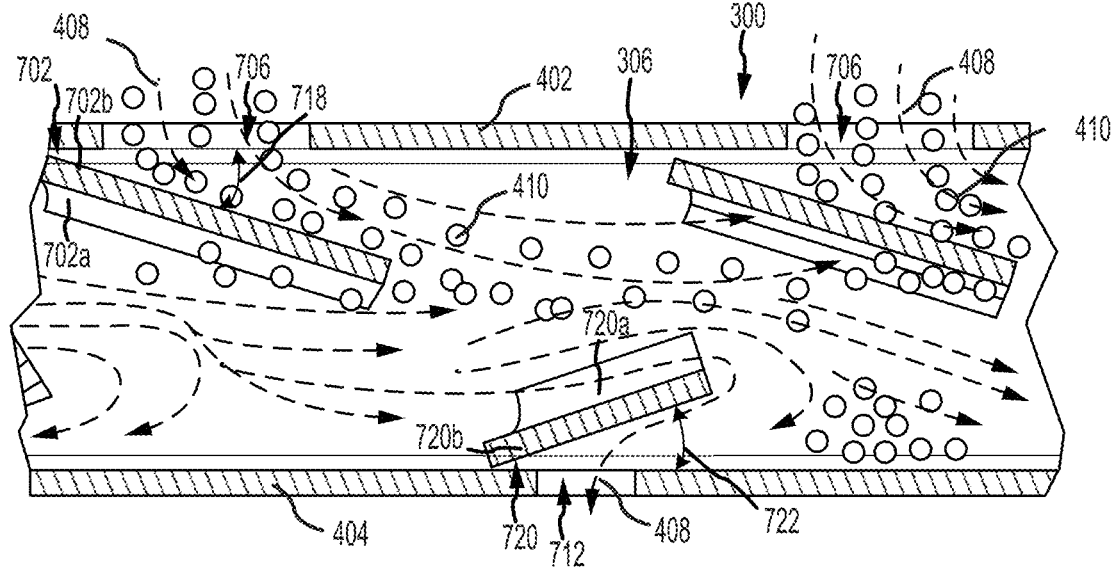
Figure 7B:
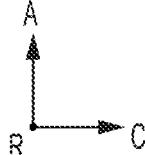

Referring to FIGS. 7A and 7B, an isometric view and a top cross-sectional view along line B-B, respectively, of a portion of an accessible debris separator for use in a gas turbine engine are illustrated, in accordance with various embodiments. In various embodiments, the accessible debris separator 300 includes an entrance or forward wall 402 and an exit or aft wall 404 aft of the forward wall 402. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

In various embodiments, the forward wall 402 of the accessible debris separator 300 may include a plurality of inlet openings 706 that allows cooling air 408 with debris particulates 410 to enter the chamber 306. In various embodiments, the aft wall 404 of the accessible debris separator 300 may include a plurality of outlet openings 712 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in a first circumferential direction due to a first diverter 702 positioned aft of each of the plurality of inlet openings 706. In various embodiments, the first diverter 702 includes a base component 702a that may be coupled to at least one of the inner wall 302, the outer wall 304, or the forward wall 402, and an extension component 702b that is coupled to the base component 702a and extends circumferentially from the forward wall 402 into the chamber 306 at a first angle 718, angle 718 being formed by extension component 702*b* and inlet opening 706. In various embodiments, the first angle 718 may be between 5 and 30 degrees.

In various embodiments, as the cooling air 408 with debris particulates 410 passes the first diverter 702, the cooling air 408 is forced to change direction in a second circumferential direction due to a second diverter 720 positioned forward of each of the plurality of outlet openings 712. In various embodiments, the second circumferential direction is opposite the first circumferential direction. In various embodiments, the second diverter 720 includes a base component 720*a* that may be coupled to at least one of the inner wall 302, the outer wall 304, or the aft wall 404, and an extension component 720*b* that is coupled to the base component 720*a* and extends circumferentially from the aft wall 404 into the chamber 306 at a second angle 722, angle 722 being formed by extension component 720*b* and outlet opening 712. In various embodiments, the second angle 722 may be between 5 and 30 degrees. In various embodiments, due to the inclusion of the first diverter 702 and the second diverter 720, the plurality of inlet openings 706 in the forward wall 402 may not align, i.e. are offset, with the plurality of outlet openings 712 in the aft wall 404. In that regard, in various embodiments, as the cooling air 408 with debris particulates 410 enters the chamber 306, the cooling air 408 is forced to take a circuitous path in the first circumferential direction due to the first diverter 702 and then in the second circumferential direction due to the second diverter 720. In that regard, the cooling air 408 is forced to make sharp turns in order to exit the chamber 306 via the plurality of outlet openings 712.

Accordingly, in various embodiments, the first diverter 702 and the second diverter 720 are part of a set of components within the chamber 306 that forces the cooling air 408 to make sharp turns, another component being the misalignment of the plurality of inlet openings 706 in the forward wall 402 with the plurality of outlet openings 712 in the aft wall 404. In various embodiments, the sharp turns made by the cooling air 408 forces the debris particulates 410 to separate from the cooling air 408. In various embodiments, the debris particulates 410 move radially within the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Figure 8A:
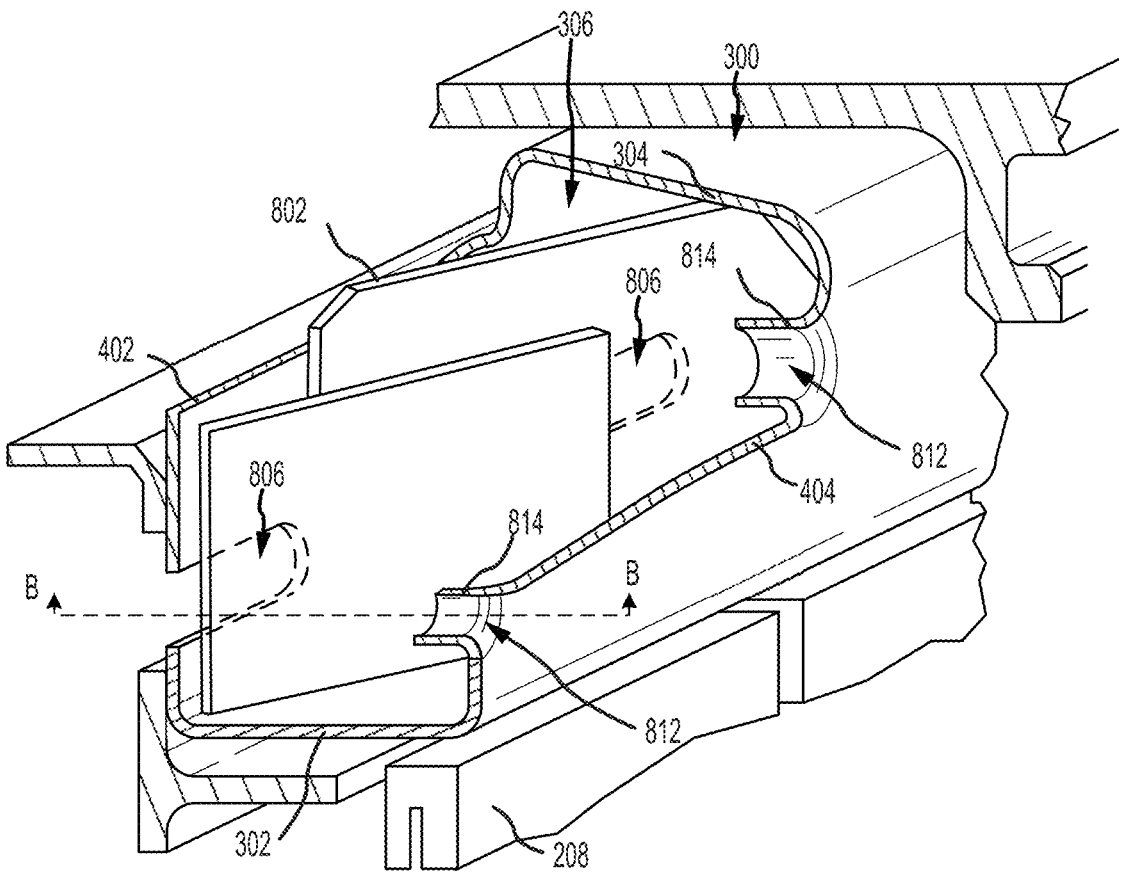
FIGS. 8A and 8B illustrate an isometric view and a radial cross-sectional view along line B-B, respectively, of a portion of an accessible debris separator for use in a gas turbine engine, in accordance with various embodiments.
Figure 8A:
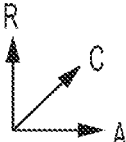
Figure 8B:
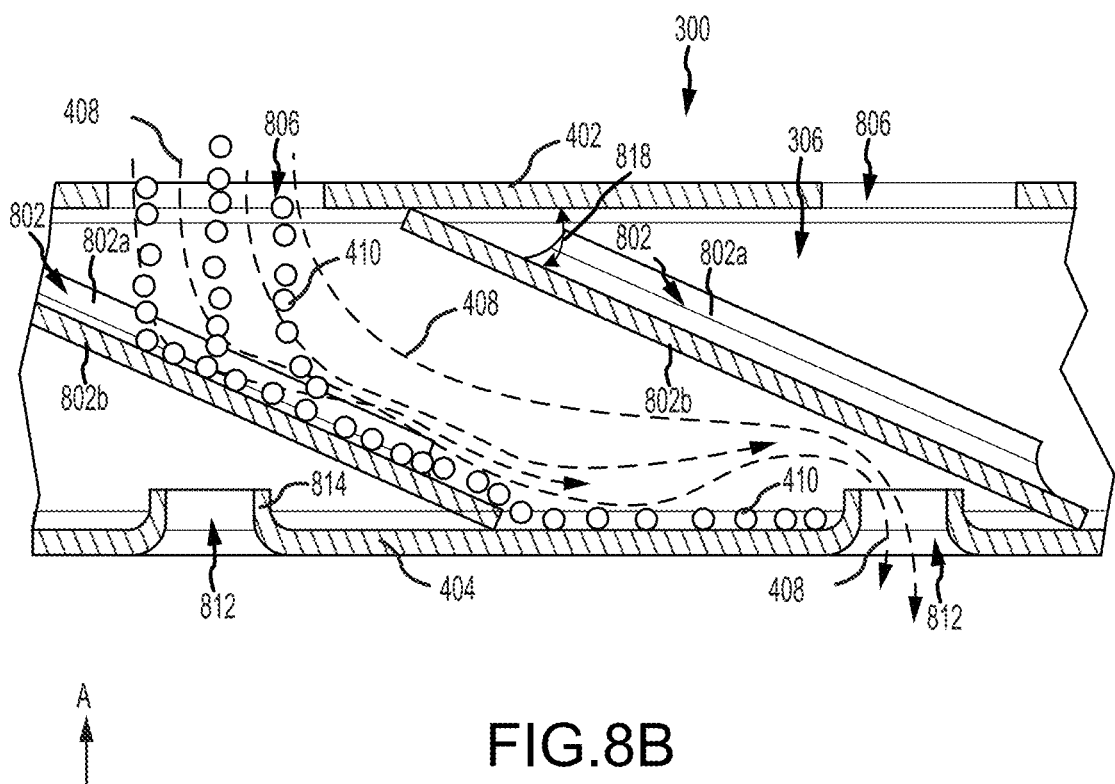

Referring to FIGS. 8A and 8B, an isometric view and a radial cross-sectional view along line B-B, respectively, of a portion of an accessible debris separator for use in a gas turbine engine are illustrated, in accordance with various embodiments. In various embodiments, the accessible debris separator 300 includes an entrance or forward wall 402 and an exit or aft wall 404 aft of the forward wall 402. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

In various embodiments, the forward wall 402 of the accessible debris separator 300 may include a plurality of inlet openings 806 that allows cooling air 408 with debris particulates 410 to enter the chamber 306. In various embodiments, the aft wall 404 of the accessible debris separator 300 may include a plurality of outlet openings 812 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in a first circumferential direction due to a diverter 802 positioned aft of each of the plurality of inlet openings 806. In various embodiments, the diverter 802 includes a base component 802*a* that may be coupled to at least one of the inner wall 302 or the outer wall 304, and an extension component 802*b* that is coupled to the base component 702*a* and extends circumferentially from the forward wall 402 into the chamber 306 and to the aft wall 404 at an angle 818, angle 818 being the angle between extension component 802*b* and forward wall 402. In various embodiments, the angle 818 may be between 5 and 30 degrees. In various embodiments, the plurality of outlet openings 812 may include a cylindrical protrusion 814 that protrudes axially forward into the chamber 306 from the aft wall 404. In various embodiments, the cylindrical protrusion 814 may extend into the chamber 306 between one-eighth to one-half of the distance between the aft wall 404 and the forward wall 402. In various embodiments, as the cooling air 408 with debris particulates 410 enters the chamber 306 via the plurality of inlet openings 806, the cooling air 408 encounter the diverter 802 and is forced to change direction in a circumferential direction. Then, in various embodiments, the cooling air encounters the cylindrical protrusion 814 and is again forced to change direction in an axially forward direction and then in an axially aft direction in order to exit the chamber 306 via the plurality of outlet openings 812.

Accordingly, in various embodiments, the diverter 802 is a first component of a set of components within the chamber 306 that forces the cooling air 408 to make sharp turns, another component being the cylindrical protrusion 814, and yet another component being the misalignment of the plurality of inlet openings 806 in the forward wall 402 with the plurality of outlet openings 812 in the aft wall 404. In various embodiments, the sharp turns made by the cooling air 408 forces the debris particulates 410 to separate from the cooling air 408. In various embodiments, the debris particulates 410 move radially within the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Figure 9A:
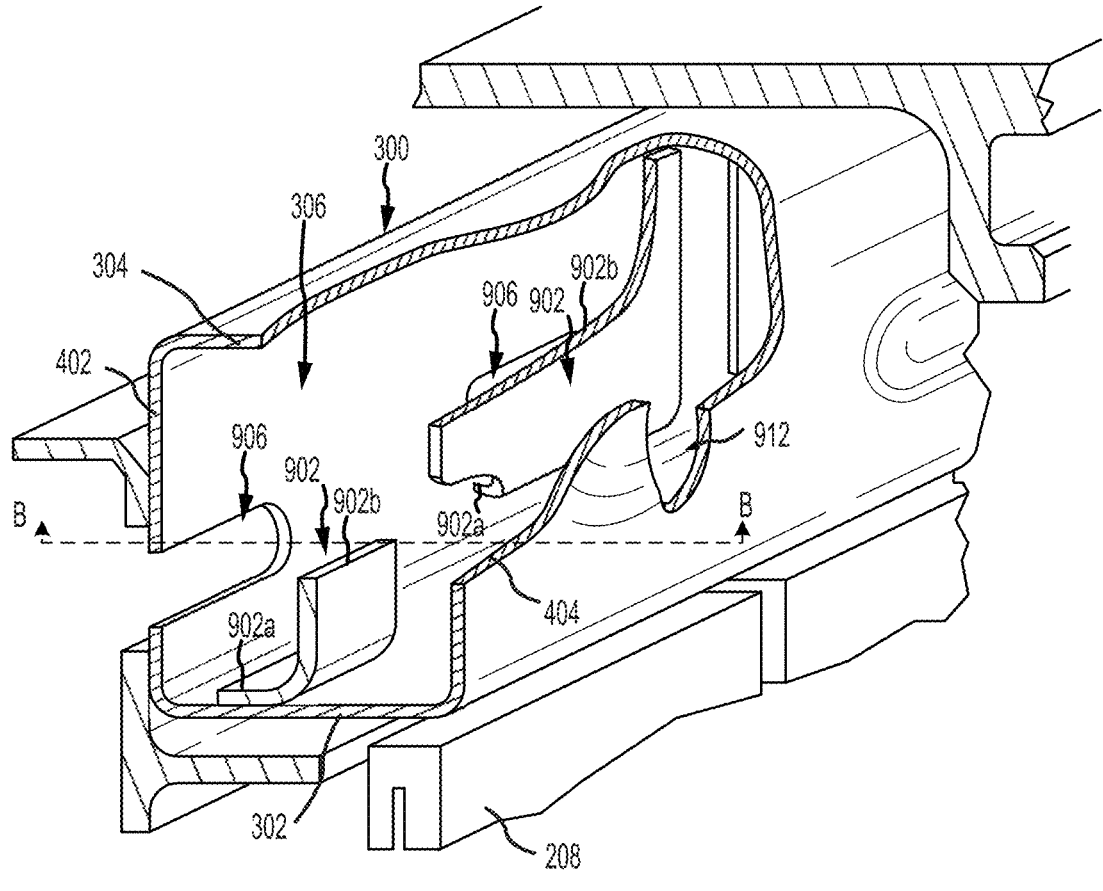
FIGS. 9A and 9B illustrate an isometric view and a top cross-sectional view along line B-B, respectively, of a portion of an accessible debris separator for use in a gas turbine engine, in accordance with various embodiments.
Figure 9A:
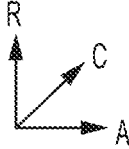
Figure 9B:
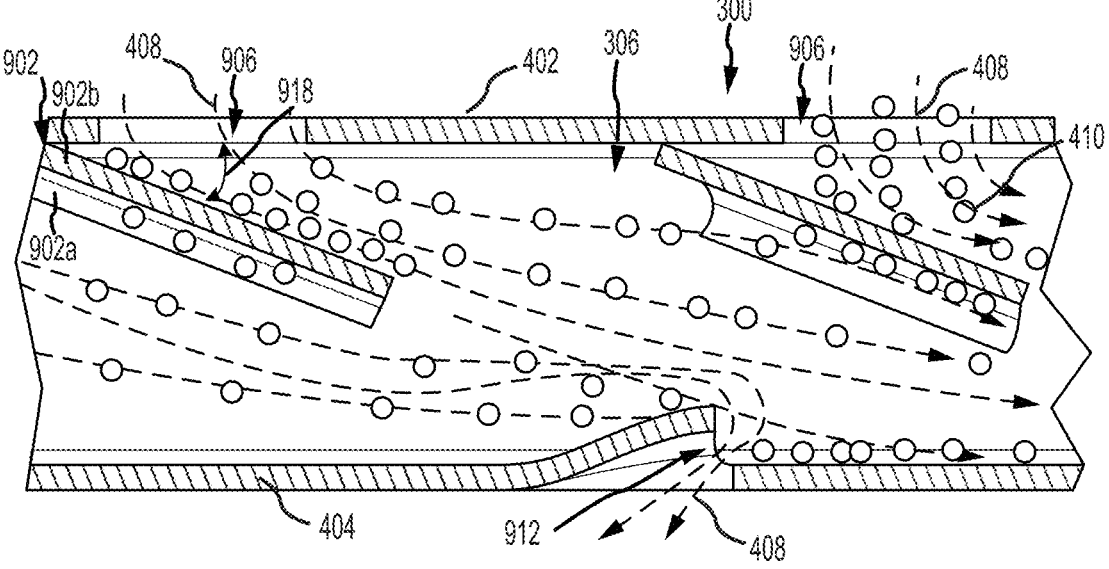
Figure 9B:
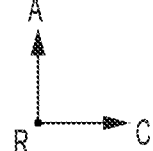

Referring to FIGS. 9A and 9B, an isometric view and a top cross-sectional view along line B-B, respectively, of a portion of an accessible debris separator for use in a gas turbine engine are illustrated, in accordance with various embodiments. In various embodiments, the accessible debris separator 300 includes an entrance or forward wall 402 and an exit or aft wall 404 aft of the forward wall 402. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

In various embodiments, the forward wall 402 of the accessible debris separator 300 may include a plurality of inlet openings 906 that allows cooling air 408 with debris particulates 410 to enter the chamber 306. In various embodiments, the aft wall 404 of the accessible debris separator 300 may include a plurality of outlet openings 912 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in a first circumferential direction due to a first diverter 902 positioned aft of each of the plurality of inlet openings 906. In various embodiments, the first diverter 902 includes a base component 902a that may be coupled to at least one of the inner wall 302, the outer wall 304, or the forward wall 402, and an extension component 902b that is coupled to the base component 902a and extends circumferentially from the forward wall 402 into the chamber 306 at an angle 918, angle 918 being formed by extension component 902b and inlet opening 906. In various embodiments, the angle 918 may be between 5 and 30 degrees.

In various embodiments, as the cooling air 408 with debris particulates 410 passes the first diverter 902, the cooling air 408 is forced to change direction in a second circumferential direction due to a configuration of each of the plurality of outlet openings 912. In that regard, each of the outlet openings of the plurality of outlet openings 912 are circumferentially-directed outlet openings such that a portion of the aft wall 404 is positioned inward, i.e. forward, into the chamber 306 providing an outlet opening of the plurality of outlet openings 912 in the circumferential direction as opposed to the axial openings in FIGS. 4A, 4B, 5A, 5B, 6A, 6B, 7A, 7B, 8A, and 8B. In various embodiments, the second circumferential direction is opposite the first circumferential direction. In various embodiments, due to the inclusion of the first diverter 902 and the plurality of outlet openings 912, the plurality of inlet openings 906 in the forward wall 402 may not align, i.e. are offset, with the plurality of outlet openings 912 in the aft wall 404. In that regard, in various embodiments, as the cooling air 408 with debris particulates 410 enters the chamber 306, the cooling air 408 is forced to take a circuitous path in the first circumferential direction due to the first diverter 902 and then in the second circumferential direction due to the plurality of outlet openings 912. In that regard, the cooling air 408 is forced to make sharp turns in order to exit the chamber 306 via the plurality of outlet openings 712.

Accordingly, in various embodiments, the first diverter 902 is a component of a set of components within the chamber 306 that forces the cooling air 408 to make sharp turns, another being the direction of the plurality of outlet openings 912, and yet another component being the misalignment of the plurality of inlet openings 906 in the forward wall 402 with the plurality of outlet openings 912 in the aft wall 404. In various embodiments, the sharp turns made by the cooling air 408 forces the debris particulates 410 to separate from the cooling air 408. In various embodiments, the debris particulates 410 move radially within the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Figure 10A:
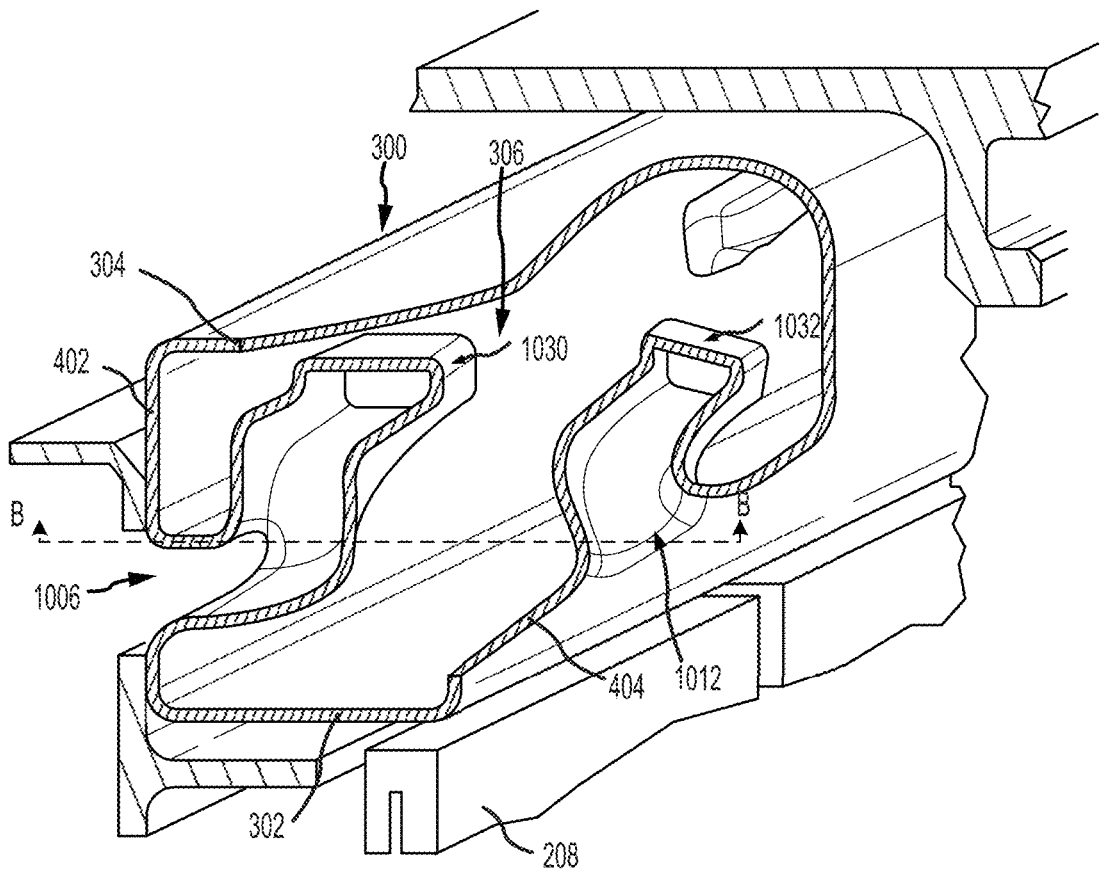
FIGS. 10A and 10B, an isometric view and a top cross-sectional view along line B-B, respectively, of a portion of an accessible debris separator for use in a gas turbine engine are illustrated, in accordance with various embodiments.
Figure 10A:
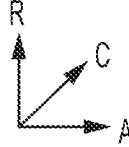
Figure 10B:
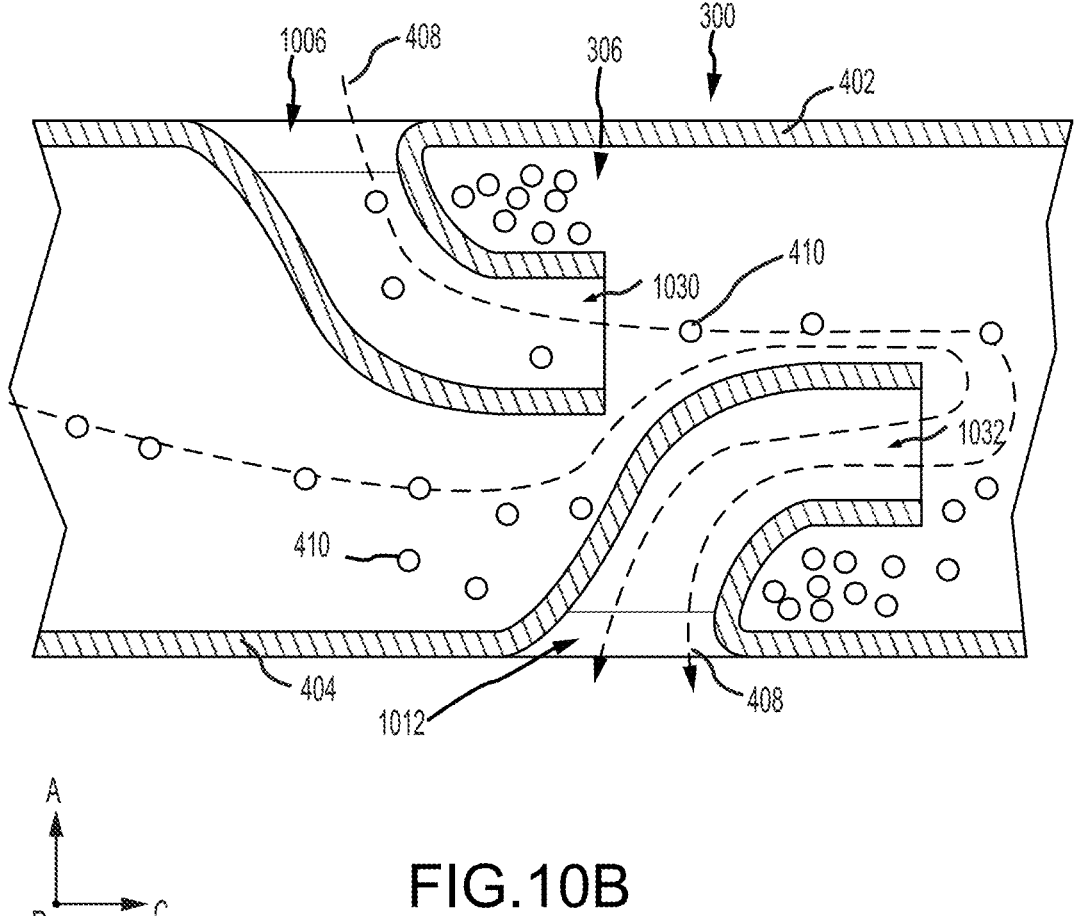

Referring to FIGS. 10A and 10B, an isometric view and a top cross-sectional view along line B-B, respectively, of a portion of an accessible debris separator for use in a gas turbine engine are illustrated, in accordance with various embodiments. In various embodiments, the accessible debris separator 300 includes an entrance or forward wall 402 and an exit or aft wall 404 aft of the forward wall 402. In various embodiments, the aft wall is separated from the forward wall by a first distance. In various embodiments, the accessible debris separator 300 includes an inner wall 302 having a first circumference and an outer wall 304 radially outward from the inner wall 302 and having a second circumference, the second circumference being larger than the first circumference. In various embodiments, the inner wall 302 is coupled to the forward wall 402 and the aft wall 404. In various embodiments, the outer wall 304 is coupled to the forward wall 402 and the aft wall 404. In that regard, in various embodiments, the forward wall 402, the aft wall 404, the inner wall 302, and the outer wall 304 form a chamber 306. In various embodiments, the accessible debris separator 300 may be positioned forward of a BOAS, such as the BOAS 208 of FIG. 2, in order to significantly improve the cleanliness of the cooling air that is passed to turbine gas path components such as the BOAS. In that regards, the accessible debris separator 300 may be coupled to a component of the gas turbine engine, such as a bulkhead, forward of the BOAS 208.

In various embodiments, the forward wall 402 of the accessible debris separator 300 may include a plurality of inlet openings 1006 that allows cooling air 408 with debris particulates 410 to enter the chamber 306. In various embodiments, the aft wall 404 of the accessible debris separator 300 may include a plurality of outlet openings 1012 that allows cooling air 408 relatively free of debris particulates 410 to exit the chamber 306. In that regard, in various embodiments, as the cooling air 408 with debris particulates 410 enters the chamber 306, the cooling air 408 is forced to take a circuitous path in a first circumferential direction due to an inlet device 1030 coupled to each of the plurality of inlet openings 1006 and extending into the chamber 306. In various embodiments, the inlet device 1030 may be a tube or closed channel, among others, which redirects the cooling air 408 with debris particulates 410 in a first circumferential direction.

In various embodiments, the accessible debris separator 300 further includes an outlet device 1032 coupled to each of the plurality of outlet openings 1012 and extending into the chamber 306. In various embodiments, the outlet device 1032 may be a tube or closed channel, among others. In various embodiments, as the cooling air 408 with debris particulates 410 exits the inlet device 1030, the cooling air 408 is forced to change direction in a second circumferential direction due to a configuration of each of the outlet device 1032. In various embodiments, the second circumferential direction is opposite the first circumferential direction. In various embodiments, due to the inclusion of the inlet device 1030 and the outlet device 1032, the plurality of inlet openings 906 in the forward wall 402 may or may not align, i.e. may be offset, with the plurality of outlet openings 912 in the aft wall 404. In that regard, in various embodiments, as the cooling air 408 with debris particulates 410 enters the chamber 306, the cooling air 408 is forced to take a circuitous path in the first circumferential direction due to the inlet device 1030 and then in the second circumferential direction due to the outlet device 1032. In that regard, the cooling air 408 is forced to make sharp turns in order to exit the chamber 306 via the plurality of outlet openings 1012.

Accordingly, in various embodiments, the inlet device 1030 is a component of a set of components within the chamber 306 that forces the cooling air 408 to make sharp turns, another being the outlet device 1032, and yet another component being the misalignment, where implements, of the plurality of inlet openings 1006 in the forward wall 402 with the plurality of outlet openings 1012 in the aft wall 404. In various embodiments, the sharp turns made by the cooling air 408 forces the debris particulates 410 to separate from the cooling air 408. In various embodiments, the debris particulates 410 move to a lower portion of the chamber 306, which may later be removed from the chamber 306 via a respective port, such as respective port 308 of FIG. 3, in the gas turbine engine aligned with case bosses or borescope ports, among others. Therefore, in various embodiments, by separating the debris particulates 410 from the cooling air 408, the accessible debris separator 300 significantly improves the cleanliness of the cooling air 408 that is passed to turbine gas path components, such as the BOAS 208.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An accessible debris separator for a gas turbine engine, the accessible debris separator comprising:
   a chamber formed by an entrance wall, an exit wall, an inner wall, and an outer wall;
   a plurality of inlet openings in the entrance wall;
   a plurality of outlet openings in the exit wall; and
   a component within the chamber, the component forcing cooling air with debris particulates entering the chamber via an inlet opening of the plurality of inlet openings to take a circuitous path thereby separating the debris particulates from the cooling air prior to the cooling air exiting the chamber via an outlet opening of the plurality of outlet openings, wherein the component within the chamber is a diverter, the diverter coupled to at least one of the inner wall or the outer wall and extending radially into the chamber past the plurality of inlet openings, wherein the component within the chamber is a set of components, wherein the diverter is a first component of the set of components, and wherein a second component of the set of components is a protrusion, the protrusion protruding opposite the entrance wall into the chamber from the outlet opening of the plurality of outlet openings in the exit wall.

2. The accessible debris separator of claim 1, wherein the plurality of inlet openings in the entrance wall are offset in a circumferential direction with the plurality of outlet openings in the exit wall.

3. The accessible debris separator of claim 1, wherein the accessible debris separator further comprises:
   a port aligned with a radially outward portion of the accessible debris separator, where the port provides for removal of an accumulation of the debris particulates separated from the cooling air.

4. The accessible debris separator of claim 3, wherein the port further aligns with a case boss or a borescope port of the gas turbine engine.

5. The accessible debris separator of claim 3, wherein accessible debris separator is separated into a plurality of sub-chambers.

6. The accessible debris separator of claim 5, wherein each sub-chamber of the plurality of sub-chambers comprises an associated port that provides for removal of the accumulation of the debris particulates separated from the cooling air in a respective sub-chamber.

7. The accessible debris separator of claim 1, wherein the accessible debris separator is positioned within at least one of a diffuser or turbine case.

8. The accessible debris separator of claim 1, wherein the accessible debris separator is positioned forward a blade outer air seal (BOAS).

9. The accessible debris separator of claim 1, wherein the accessible debris separator is one of a plurality of accessible debris separators and wherein each accessible debris separator of the plurality of accessible debris separators is positioned forward a blade outer air seal (BOAS).

10. A gas turbine engine comprising:
a blade outer air seal (BOAS); and an accessible debris separator positioned forward the BOAS, the accessible debris separator comprising:
a chamber formed by an entrance wall, an exit wall, an inner wall, and an outer wall;
a plurality of inlet openings in the entrance wall;
a plurality of outlet openings in the exit wall; and
a component within the chamber, the component forcing cooling air with debris particulates entering the chamber via an inlet opening of the plurality of inlet openings to take a circuitous path thereby separating the debris particulates from the cooling air prior to the cooling air exiting the chamber via an outlet opening of the plurality of outlet openings, wherein the component within the chamber is a diverter, the diverter coupled to at least one of the inner wall or the outer wall and extending radially into the chamber past the plurality of inlet openings, wherein the component within the chamber is a set of components, wherein the diverter is a first component of the set of components, and wherein a second component of the set of components is a protrusion, the protrusion protruding opposite the entrance wall into the chamber from the outlet opening of the plurality of outlet openings in the exit wall.

* * * * *